US012766654B2

(12) United States Patent
Kondo

(10) Patent No.: US 12,766,654 B2
(45) Date of Patent: Oct. 20, 2026

(54) CENTERING TOOL, CENTERING DEVICE, MACHINE TOOL, METHOD OF CENTERING CIRCULAR WORKPIECE, CIRCULAR WORKPIECE MANUFACTURING METHOD, RING MEMBER MANUFACTURING METHOD, BEARING MANUFACTURING METHOD, MACHINE MANUFACTURING METHOD, VEHICLE MANUFACTURING METHOD, AND PROGRAM

(71) Applicant: NSK LTD., Tokyo (JP)

(72) Inventor: Shinya Kondo, Fujisawa (JP)

(73) Assignee: NSK LTD., Tokyo (JP)

( * ) Notice: Subject to any disclaimer, the term of this patent is extended or adjusted under 35 U.S.C. 154(b) by 783 days.

(21) Appl. No.: 18/042,102

(22) PCT Filed: Oct. 20, 2021

(86) PCT No.: PCT/JP2021/038840
§ 371 (c)(1),
(2) Date: Feb. 17, 2023

(87) PCT Pub. No.: WO2022/085744
PCT Pub. Date: Apr. 28, 2022

(65) Prior Publication Data

US 2023/0330797 A1 Oct. 19, 2023

(30) Foreign Application Priority Data

Oct. 21, 2020 (JP) ................................ 2020-176855

(51) Int. Cl.
*B23Q 3/18* (2006.01)

(52) U.S. Cl.
CPC ................................... *B23Q 3/183* (2013.01)

(58) Field of Classification Search
CPC .... B23Q 3/183; B23Q 3/18; B23Q 2017/001; B23Q 2230/002; B23Q 17/2291;
(Continued)

(56) References Cited

U.S. PATENT DOCUMENTS 4,651,438 A * 3/1987 Hutter .................... G01B 5/201
33/550
4,790,545 A 12/1988 Dzewaltowski et al.
(Continued)

FOREIGN PATENT DOCUMENTS

JP 61-152353 A 7/1986
JP 1-183366 A 7/1989
(Continued)

OTHER PUBLICATIONS

Translation of Written Opinion of PCT/JP2021/038840. (Year: 2025).*

(Continued)

*Primary Examiner* — Nicole N Ramos
(74) *Attorney, Agent, or Firm* — Sughrue Mion, PLLC

(57) ABSTRACT

A centering tool includes: a shank portion having a shaft portion for attachment; a rotating member rotatably supported by the shank portion and having a pair of contacts disposed apart from each other in a direction orthogonal to an axis of the shank portion; and a displacement sensor provided integrally with the shank portion and detecting displacement in the direction orthogonal to the axis of the shank portion at an intermediate position between the pair of contacts, in which a circular workpiece is centered by being pushed toward a rotation center of a rotary table while each of the pair of contacts is caused to abut against a peripheral surface of the circular workpiece disposed on the rotary table.

4 Claims, 14 Drawing Sheets

(58) Field of Classification Search

CPC ...... B23Q 17/22; B23Q 1/76; B23B 2270/12; B23B 23/00; B23B 23/005; B23B 23/02; B23B 23/025; B23B 23/04; B23B 23/045; B23B 25/06

See application file for complete search history.

(56) References Cited

U.S. PATENT DOCUMENTS

| | | | |
|---|---|---|---|
| 5,108,117 | A | 4/1992 | Crossman et al. |
| 5,835,208 | A | 11/1998 | Hollmann et al. |
| 6,519,861 | B1 | 2/2003 | Brueck et al. |
| 2007/0228673 | A1 | 10/2007 | Koshino |

FOREIGN PATENT DOCUMENTS

| | | | | | |
|---|---|---|---|---|---|
| JP | H01183366 | A | * | 7/1989 | |
| JP | 1-217760 | A | | 8/1989 | |
| JP | H08347 | B2 | * | 1/1996 | ............. B23Q 3/183 |
| JP | 2003-157589 | A | | 5/2003 | |
| JP | 2007245241 | A | * | 9/2007 | ............. B23Q 3/183 |
| JP | 4833696 | B2 | | 9/2011 | |

OTHER PUBLICATIONS

Machine Translation of JP-H01183366-A. (Year: 2026).*
Machine Translation of JP-2007245241-A, (Year: 2026).*
Machine Translation of JP-H08347-B2. (Year: 2026).*
International Search Report (PCT/ISA/210) issued Nov. 22, 2021 from the International Searching Authority to International Application No. PCT/JP2021/038840.
Written Opinion (PCT/ISA/237) issued Nov. 22, 2021 from the International Searching Authority to International Application No. PCT/JP2021/038840.
Extended European Search Report issued Sep. 12, 2022 from the European Patent Office to EP Application No. 21854862.6.

* cited by examiner

CENTERING TOOL, CENTERING DEVICE, MACHINE TOOL, METHOD OF CENTERING CIRCULAR WORKPIECE, CIRCULAR WORKPIECE MANUFACTURING METHOD, RING MEMBER MANUFACTURING METHOD, BEARING MANUFACTURING METHOD, MACHINE MANUFACTURING METHOD, VEHICLE MANUFACTURING METHOD, AND PROGRAM

CROSS-REFERENCE TO RELATED APPLICATIONS

This application is a National Phase Entry of PCT International Application No. PCT/JP2021/038840 filed on Oct. 20, 2021, which claims priority to Japanese Patent Application No. 2020-176855 filed on Oct. 21, 2020, the contents of all of which are incorporated herein by reference in their entirety.

TECHNICAL FIELD

The present invention relates to a centering tool, a centering device, a machine tool, a circular workpiece centering method, a circular workpiece manufacturing method, a ring member manufacturing method, a bearing manufacturing method, a machine manufacturing method, a vehicle manufacturing method, and a program.

BACKGROUND ART

The techniques that are described in Patent Literature 1, Patent Literature 2, and Patent Literature 3 are examples of a technique for automatically centering a circular (cylindrical) workpiece on a rotary table. By the centering method of Patent Literature 1, the side surface of a cylindrical workpiece is measured by a displacement sensor during table rotation and the cylindrical workpiece is pushed and moved toward the center of rotation by a tool configured with one roller. When the runout of the displacement sensor is equal to or less than a threshold, the tool is retracted and the centering step is completed. In addition, in the centering devices of Patent Literature 2 and Patent Literature 3, centering is performed while a tool configured to have a pair of rollers pushes and moves the side surface of a cylindrical workpiece.

CITATION LIST

Patent Literature

Patent Literature 1: JP-A-1-217760
Patent Literature 2: JP-A-2003-157589
Patent Literature 3: Japanese Patent No. 4833696

SUMMARY OF INVENTION

Technical Problem

In the centering method of Patent Literature 1, the outer peripheral surface of the cylindrical workpiece is pushed and moved by one-point contact. Accordingly, in the end, the tool comes into contact only with the projecting portion that is on the surface of the cylindrical workpiece. Accordingly, centering here means aligning the center of the minimum circumscribed circle on the outer peripheral surface of the cylindrical workpiece with the center of rotation. However, in a machine tool such as a grinding machine, it is necessary to align the center of the maximum inscribed circle in a workpiece shape with the center of rotation in order to ensure a material machining allowance (cutting allowance), and in the case of realizing high-precision machining in particular, centering of the center of the minimum circumscribed circle cannot be adopted.

By the centering method of Patent Literature 2, the tool provided with the pair of rollers is pressed against the cylindrical workpiece and the outer periphery of the cylindrical workpiece follows the outer periphery of a reference turntable. By the centering method of Patent Literature 3, the tool is continuously pushed until the runout of the cylindrical workpiece is settled. However, it is required to realize a simpler and more accurate centering technique in response to, for example, precision machining requiring a particularly high level of precision, a post-centering pass or fail determination may be required in view of roundness, and further centering technique improvement is eagerly desired.

In this regard, an object of the present invention is to provide a centering tool, a centering device, a machine tool using the centering tool, a circular workpiece centering method, a circular workpiece manufacturing method, a ring member manufacturing method, a bearing manufacturing method, a machine manufacturing method, a vehicle manufacturing method, and a program that can realize centering based on the center runout of an inscribed circle that can ensure the machining allowance of the material of a circular workpiece, and can automatically reduce the misalignment of the circular workpiece to an allowable range.

Solution to Problem

The present invention has the following configuration.

(1) A centering tool including:

a shank portion having a shaft portion for attachment;

a rotating member rotatably supported by the shank portion and having a pair of contacts disposed apart from each other in a direction orthogonal to an axis of the shank portion; and a displacement sensor provided integrally with the shank portion and detecting displacement in the direction orthogonal to the axis at an intermediate position between the pair of contacts, in which a circular workpiece is centered by being pushed toward a rotation center of a rotary table while each of the pair of contacts is caused to abut against a peripheral surface of the circular workpiece disposed on the rotary table.

According to this centering tool, the pair of contacts of the rotating member follow the shape of the circular workpiece. Accordingly, when the centering tool is moved to push out the circular workpiece, the projecting portion that is on the peripheral surface of the circular workpiece is not pushed alone. In addition, the displacement sensor disposed at the intermediate position between the pair of contacts is capable of detecting the misalignment of the center of the inscribed circle in the circular workpiece and centering based on the center of the inscribed circle can be performed. As a result, more precise centering can be performed as compared with a case where a contact comes into one-point contact with the peripheral surface of a circular workpiece.

(2) The centering tool according to (1), in which the pair of contacts are rollers rotating around axes parallel to the axis.

According to this centering tool, the roller comes into rolling contact with the peripheral surface of the workpiece, and thus damage to the peripheral surface of the workpiece can be prevented.

(3) The centering tool according to (1) or (2), in which the displacement sensor is a contact-type displacement sensor.

According to this centering tool, displacement detection can be performed with high precision and reliability.

(4) The centering tool according to any one of (1) to (3), including a bracket fixed to the shank portion and supporting the displacement sensor at a same height position as the pair of contacts in a direction of the axis.

According to this centering tool, the positions of the tips of the contacts can be accurately positioned at the height positions of the pair of contacts and the precision of circular workpiece displacement detection can be improved.

(5) A centering device including:

a rotary table where a circular workpiece is disposed;

a workpiece drive unit rotationally driving the rotary table;

the centering tool according to any one of (1) to (4);

a tool support portion supporting the centering tool with the shaft portion for attachment;

a tool drive unit moving the centering tool supported by the tool support portion; and a control unit controlling feed of the centering tool centering the circular workpiece to the rotation center of the rotary table using a detection signal on the displacement of the circular workpiece output from the displacement sensor while the tool drive unit causes the pair of contacts to abut against the peripheral surface of the rotating circular workpiece.

According to this centering device, the detection signal of the displacement sensor regarding the peripheral surface of the circular workpiece is acquired using the centering tool, the feed of the centering tool is controlled in accordance with the detection signal, and thus the circular workpiece can be centered with high precision.

(6) The centering device according to (5), in which the control unit includes:

a contact confirmation unit feeding the centering tool toward the circular workpiece while rotating the circular workpiece and confirming the contact of the pair of contacts a with the circular workpiece by the output signal of the displacement sensor;

a target position determination unit determining a feed target position of the centering tool from a waveform of the detection signal output from the displacement sensor; and a centering feed unit retracting the centering tool after moving the centering tool to the feed target position.

According to this centering device, the accurate feed target position of the centering tool can be determined from the waveform of the detection signal output from the displacement sensor. Accordingly, it is possible to complete the high-precision centering of the circular workpiece by moving the centering tool to the feed target position and retracting the centering tool.

(7) The centering device according to (6), in which the control unit further includes a determination unit determining whether center runout between a center of the circular workpiece and the rotation center of the rotary table is within a predetermined allowable range from the detection signal output from the displacement sensor when the centering tool is disposed at the feed target position.

According to this centering device, it is possible to confirm the pass or fail of the centering result by determining whether the state of misalignment in the post-centering circular workpiece is within a predetermined allowable range.

(8) A machine tool including the centering device according to any one of (5) to (7).

According to this machine tool, automatic circular workpiece centering is possible by interlocking between the centering device and various mechanisms provided in the machine tool.

(9) A circular workpiece centering method including:

a contact confirmation step of feeding the centering tool according to any one of (1) to (4) toward the rotation center of the rotary table and causing the pair of contacts to abut against the peripheral surface of the circular workpiece disposed on the rotary table while rotating the rotary table;

a target position determination step of determining a feed target position of the centering tool from a waveform of a detection signal output from the displacement sensor; and a centering feed step of retracting the centering tool after moving the centering tool to the feed target position.

According to this circular workpiece centering method, the accurate feed target position of the centering tool can be determined from the waveform of the detection signal output from the displacement sensor. Accordingly, it is possible to complete the high-precision centering of the circular workpiece by moving the centering tool to the feed target position and retracting the centering tool.

(10) The circular workpiece centering method according to (9), further including, between the contact confirmation step and the target position determination step, a rough centering step of retracting the centering tool by a predetermined certain distance after abutting against the circular workpiece, subsequently obtaining a rough feed target position where misalignment between a center of the circular workpiece and the rotation center of the rotary table is reduced using the detection signal output from the displacement sensor at the retracted position, and feeding the centering tool to the rough feed target position.

According to this circular workpiece centering method, the centering in the next step can be performed more precisely by reducing the amount of misalignment of the circular workpiece in advance by rough centering.

(11) The circular workpiece centering method according to (9) or (10), in which an amplitude of the output signal of the displacement sensor is obtained after the centering tool is retracted by a predetermined first distance after the immediately preceding step in the target position determination step and the feed target position is a position extended from a position where the centering tool is retracted by the first distance toward the rotation center of the rotary table by a second distance, which is the first distance plus a post-rough centering misalignment.

According to this centering method, although the workpiece displacement detection in a state where the centering tool is pushed toward the circular workpiece may be affected by friction between the centering tool and the circular workpiece, deformation of the tool itself, and so on and the displacement detection waveform may be distorted, the detection waveform distortion can be prevented and more accurate centering can be performed by retracting the centering tool to reduce the above effects.

(12) The circular workpiece centering method according to any one of (9) to (11), further including a determination step of obtaining a power spectrum of the detection signal output from the displacement sensor when the centering tool reaches the feed target position and determining whether there is a peak exceeding a predetermined threshold in intensity other than a rotational primary component of the circular workpiece from the obtained power spectrum, in which

- in a case where there is a peak exceeding the threshold in intensity, center runout of an inscribed circle in the circular workpiece is obtained from a difference in coordinates of at least two peaks representing recessed portions in the peripheral surface of the circular workpiece in the waveform of the detection signal, and
- in a case where there is no peak exceeding the threshold in intensity, an amplitude at a same frequency as the rotation of the rotary table in the waveform of the detection signal is obtained by FFT analysis, the amplitude is regarded as the center runout of the inscribed circle in the circular workpiece, and it is determined whether the obtained center runout is within a predetermined allowable range.

According to this circular workpiece centering method, centering evaluation is performed from the center runout of the inscribed circle in a case where the power spectrum of the detection signal has a peak exceeding the threshold other than the rotational primary component. On the other hand, in a case where a component value other than the rotational primary component does not exceed the threshold, centering evaluation is performed from the center runout of the inscribed circle obtained from the amplitude at the same frequency as the rotation of the rotary table. By using different references in accordance with the roundness of the cylindrical workpiece as described above, it is possible to perform cylindrical workpiece misalignment evaluation corresponding to a wide range of roundness.

(13) The circular workpiece centering method according to (12), in which, in the determination step, in a case where there is a rotational order component exceeding the threshold in intensity, the center runout of the inscribed circle inscribed in the peripheral surface of the circular workpiece is obtained from a difference between coordinates corresponding to peaks having maximum and minimum values among the peaks representing the recessed portions in the peripheral surface of the circular workpiece in the waveform of the detection signal output from the displacement sensor while the rotary table rotates once.

According to this circular workpiece centering method, it is possible to determine the centering with high precision by obtaining the center runout of the inscribed circle in the detection signal of the displacement sensor.

(14) A method for manufacturing a circular workpiece by the circular workpiece centering method according to any one of (9) to (13).

According to this circular workpiece manufacturing method, a highly precisely centered circular workpiece is machined, and thus high-precision manufacturing is possible.

(15) A ring member manufacturing method for manufacturing a ring member by the circular workpiece manufacturing method according to (14).

According to this ring member manufacturing method, it is possible to manufacture a ring member with high precision.

(16) A bearing manufacturing method for manufacturing at least one of an inner ring and an outer ring by the circular workpiece manufacturing method according to (14).

According to this bearing manufacturing method, it is possible to manufacture a bearing with high precision.

(17) A method for manufacturing a machine by the circular workpiece manufacturing method according to (14).

According to this machine manufacturing method, it is possible to manufacture a machine with high precision.

(18) A method for manufacturing a vehicle by the circular workpiece manufacturing method according to (14).

According to this vehicle manufacturing method, it is possible to manufacture a vehicle with high precision.

(19) A program causing a computer to sequentially realize:

- a function of feeding the centering tool according to any one of claims 1 to 4 toward the rotation center of the rotary table and causing the pair of contacts to abut against the peripheral surface of the circular workpiece placed on the rotary table while rotating the rotary table;
- a function of obtaining a feed target position of the centering tool for disposing a center of the circular workpiece at the rotation center of the rotary table using a detection signal output from the displacement sensor; and
- a function of retracting the centering tool after feeding the centering tool to the feed target position.

According to this program, the computer is capable of automatically performing centering including each of the processing of confirming contact between the centering tool and the circular workpiece, the processing of calculating the feed target position of the centering tool, and the processing of feeding and retracting the centering tool.

(20) The program according to (19), causing a computer to realize a function of determining whether a difference between the center of the circular workpiece and the rotation center of the rotary table is within a predetermined allowable range from the detection signal output from the displacement sensor when the centering tool is disposed at the feed target position.

According to this program, centering determination processing can be automatically performed by the computer.

Advantageous Effects of Invention

According to the present invention, it is possible to realize centering based on the center runout of an inscribed circle that can ensure the machining allowance of the material of a circular workpiece and the misalignment of the circular workpiece can be automatically reduced to an allowable range.

DESCRIPTION OF EMBODIMENTS

Hereinafter, an embodiment of the present invention will be described in detail with reference to the drawings. Here, a workpiece having a circular peripheral surface can be used as a workpiece to be centered and a part having a peripheral surface having a circular cross section may be at least partially included in the shape such as a columnar shape and a cylindrical shape. In addition, the shape may be a conical shape, a truncated cone shape, or the like. Further, the centering tool of the present invention is not limited to being applied to the centering of a workpiece of a machine tool and can be suitably applied without particular limitation insofar as the application includes a step of centering a member having a circular cross section perpendicular to the axial direction of the member on a rotating base such as a rotary table.

<Configuration of Centering Device>

(Overall Configuration)

Figure 1:
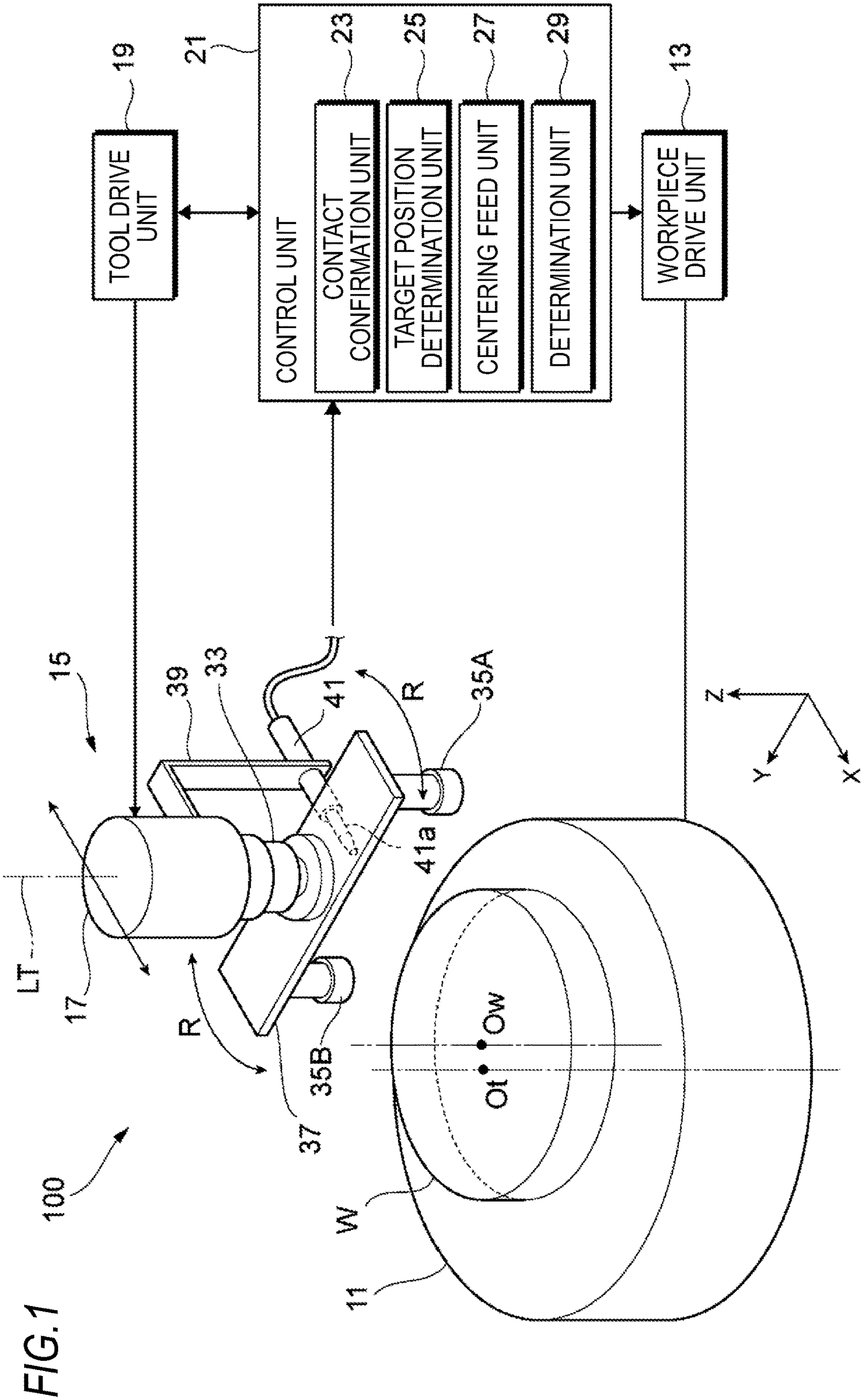
FIG. 1 is a configuration diagram of a centering device including a centering tool.

FIG. 1 is a configuration diagram of a centering device including a centering tool. A centering device 100 includes a rotary table 11 where a circular workpiece W is disposed, a workpiece drive unit 13 rotationally driving the rotary table 11, a centering tool 15, a tool support portion 17 supporting the centering tool 15, a tool drive unit 19 moving the centering tool 15 supported by the tool support portion 17, and a control unit 21.

The circular workpiece W is placed and temporarily fixed on the table surface of the rotary table 11. The temporary fixing means a state where the position of the circular workpiece W can be adjusted on the table surface by, for example, applying an external force to the disposed circular workpiece W. The temporary fixing can be realized by, for example, providing an electromagnetic chuck, a permanent magnet chuck, or the like. In addition, in a case where the circular workpiece W is heavy in weight, the circular workpiece can also be temporarily fixed simply by its own weight.

The workpiece drive unit 13 drives a drive source such as a motor connected to the rotary table 11 by receiving a command from the control unit 21. As a result, the circular workpiece W temporarily fixed to the rotary table 11 is rotated.

The tool support portion 17 movably supports the centering tool 15, which will be described in detail later, in a direction orthogonal to an axis LT. The tool drive unit 19 moves the tool support portion 17 and changes the position of the centering tool 15 by receiving a command from the control unit 21. As a result, the centering tool 15 is moved toward or away from the circular workpiece W from a position facing the peripheral surface of the circular workpiece W.

The control unit 21 controls the feed of the centering tool 15 such that the workpiece drive unit 13 and the tool drive unit 19 are driven and the rotating circular workpiece W is centered to the rotation center of the rotary table 11. The control unit 21 includes a contact confirmation unit 23, a target position determination unit 25, a centering feed unit 27, and a determination unit 29, which will be described in detail later. The control unit 21 is configured by a computer device including, for example, a calculation unit such as a CPU, a storage unit such as a memory and a storage, and an input/output unit for various signals.

As illustrated in FIG. 1, the Z and X directions in the following description are the vertical direction that is the axial direction of the rotary table 11 and the feed direction in which the centering tool 15 is moved toward the circular workpiece W, respectively. The Y direction in the following description is orthogonal to the X and Z directions. In addition, the feed toward the circular workpiece W is a forward movement (+X direction) and the feed away from the circular workpiece W is retraction (−X direction).

(Centering Tool)

Figure 2B:
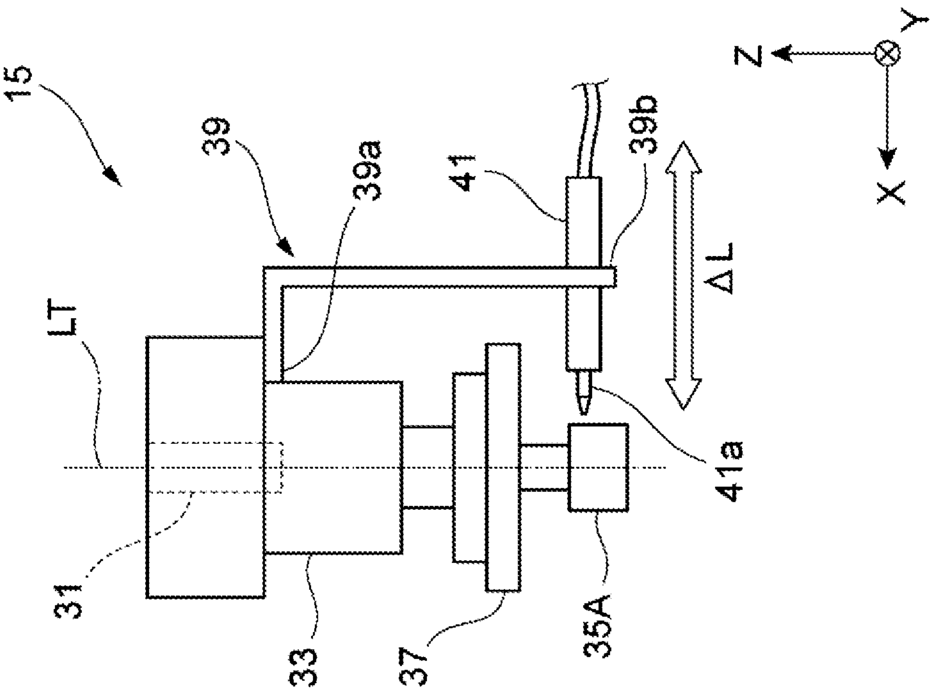
FIG. 2B is a side view of the centering tool.
Figure 2A:
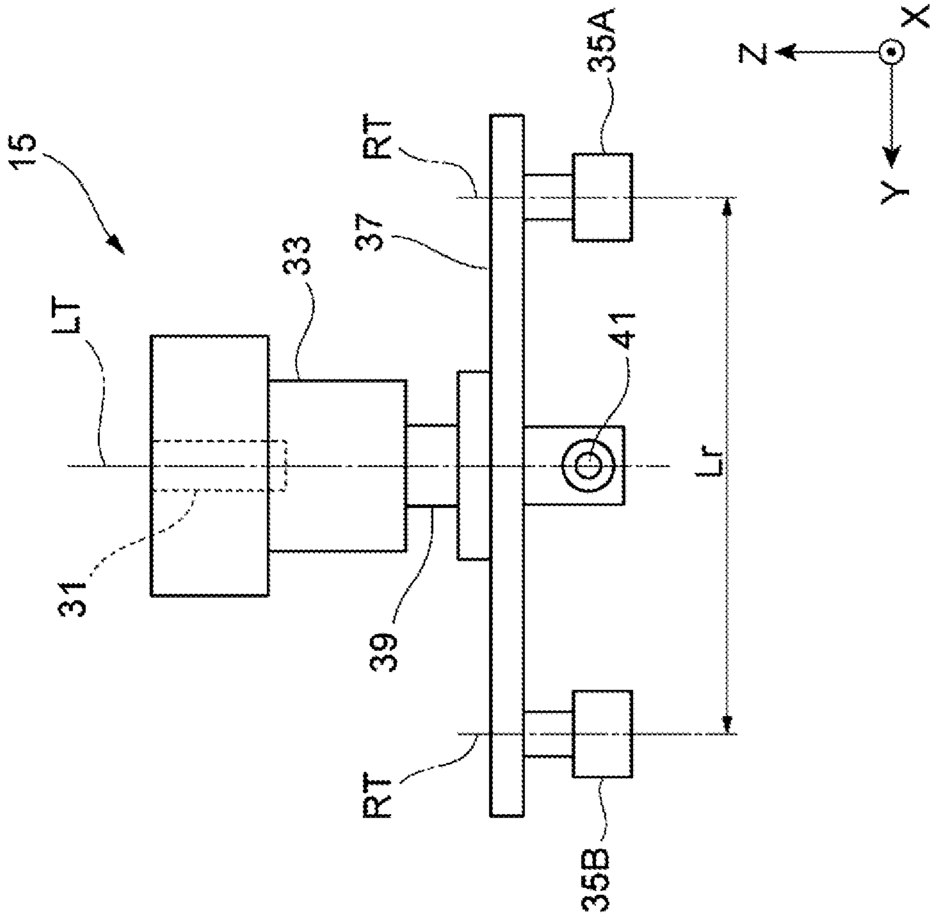
FIG. 2A is a front view of the centering tool.

FIG. 2A is a front view of the centering tool 15, and FIG. 2B is a side view of the centering tool 15. The centering tool 15 includes a shank portion 33 having a shaft portion 31 for attachment, a rotating member 37 having a pair of rollers 35A and 35B, a bracket 39, and a displacement sensor 41.

The rotating member 37 is supported by the shank portion 33 via, for example, a bearing (not illustrated) so as to be rotatable (R direction). The pair of rollers 35A and 35B are disposed so as to be separated from each other in a direction orthogonal to the axis LT of the shank portion 33 (direction in the XY plane). The rollers 35A and 35B are disposed equidistant from the axis LT and are supported by the rotating member 37 so as to be rotatable around axes RT parallel to the axis LT. The rollers 35A and 35B are contacts abutting against the circular workpiece W. A distance Lr between the roller 35A and the roller 35B can be appropriately adjusted in accordance with the size of the workpiece to be measured. The shank portion 33, the rotating member 37, and the pair of rollers 35A and 35B have rigidity to withstand the external force at a time when the centering tool 15 is pressed against the circular workpiece, which will be described later.

The contact is not limited to the rollers 35A and 35B coming into rolling contact with the circular workpiece W. The contact may be a member, a column, a cylinder, or a sphere having a surface having a curved surface having a circular arc-shaped cross section. The material of the contact surface can be appropriately changed, and examples of the material include metal, ceramics, resin, and what is obtained by coating the surface of metal or ceramics with resin. It is preferable that the material is capable of preventing the workpiece from being scratched.

The bracket 39 is a member extending from one end portion 39*a* to the other end portion 39*b*. The one end portion 39*a* is fixed to the shank portion 33. The displacement sensor 41 is provided in the other end portion 39*b*. The bracket 39 supports the displacement sensor 41 so as to be positionally adjustable in the front-rear direction (arrow ΔL) at the same height position as the pair of rollers 35A and 35B in the direction of the axis LT (Z direction) and at the intermediate position between the pair of rollers 35A and 35B. In other words, the displacement sensor 41 is supported integrally with the shank portion 33 via the bracket 39 and is provided so as not to rotate with the R-direction rotation of the rotating member 37 illustrated in FIG. 1.

The displacement sensor 41 is disposed orthogonal to the axis LT and detects the displacement of the peripheral surface of the circular workpiece W when the centering operation is executed. A contact-type displacement sensor such as an electric micrometer with a directly moving tip spindle 41*a* can be used as the displacement sensor 41. In addition, a non-contact displacement sensor such as a laser sensor, an ultrasonic sensor, and an eddy current type sensor can be used as the displacement sensor 41.

Figure 3:
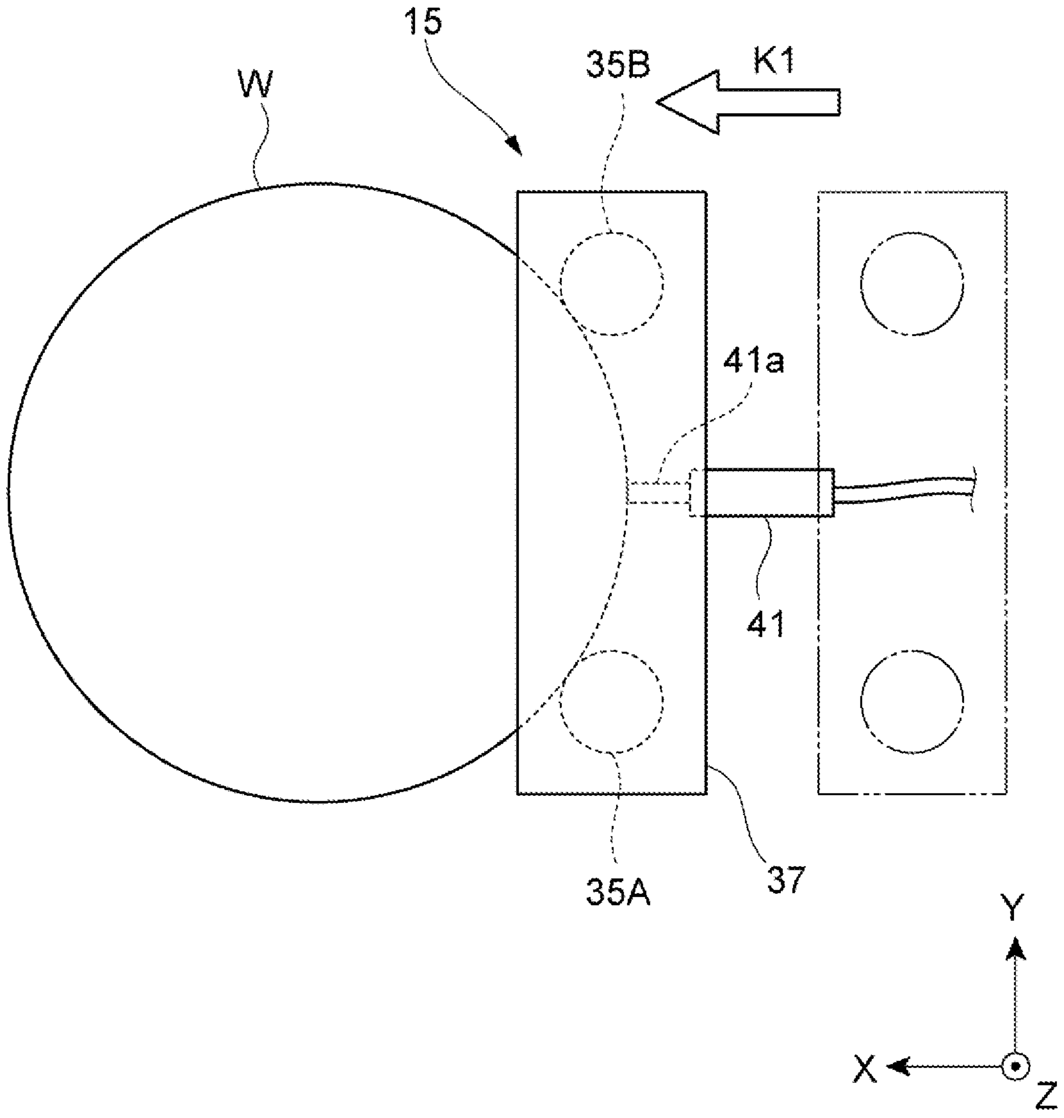
FIG. 3 is an explanatory diagram schematically illustrating how the centering tool abuts against a circular workpiece when the circular workpiece is centered.

FIG. 3 is an explanatory diagram schematically illustrating how the centering tool 15 abuts against the circular workpiece W when the circular workpiece W is centered. The centering tool 15 is attached to the tool support portion 17 illustrated in FIG. 1 and is moved toward the circular workpiece W, as indicated by an arrow K1, by the drive of the tool drive unit 19. As illustrated in FIG. 3, the rotatable rotating member 37 rotates when the rollers 35A and 35B abut against the outer peripheral surface of the circular workpiece W. As a result, the spindle 41*a* of the displacement sensor 41 is disposed along the normal direction of the outer peripheral surface of the circular workpiece W.

<Centering Procedure>

Figure 4:
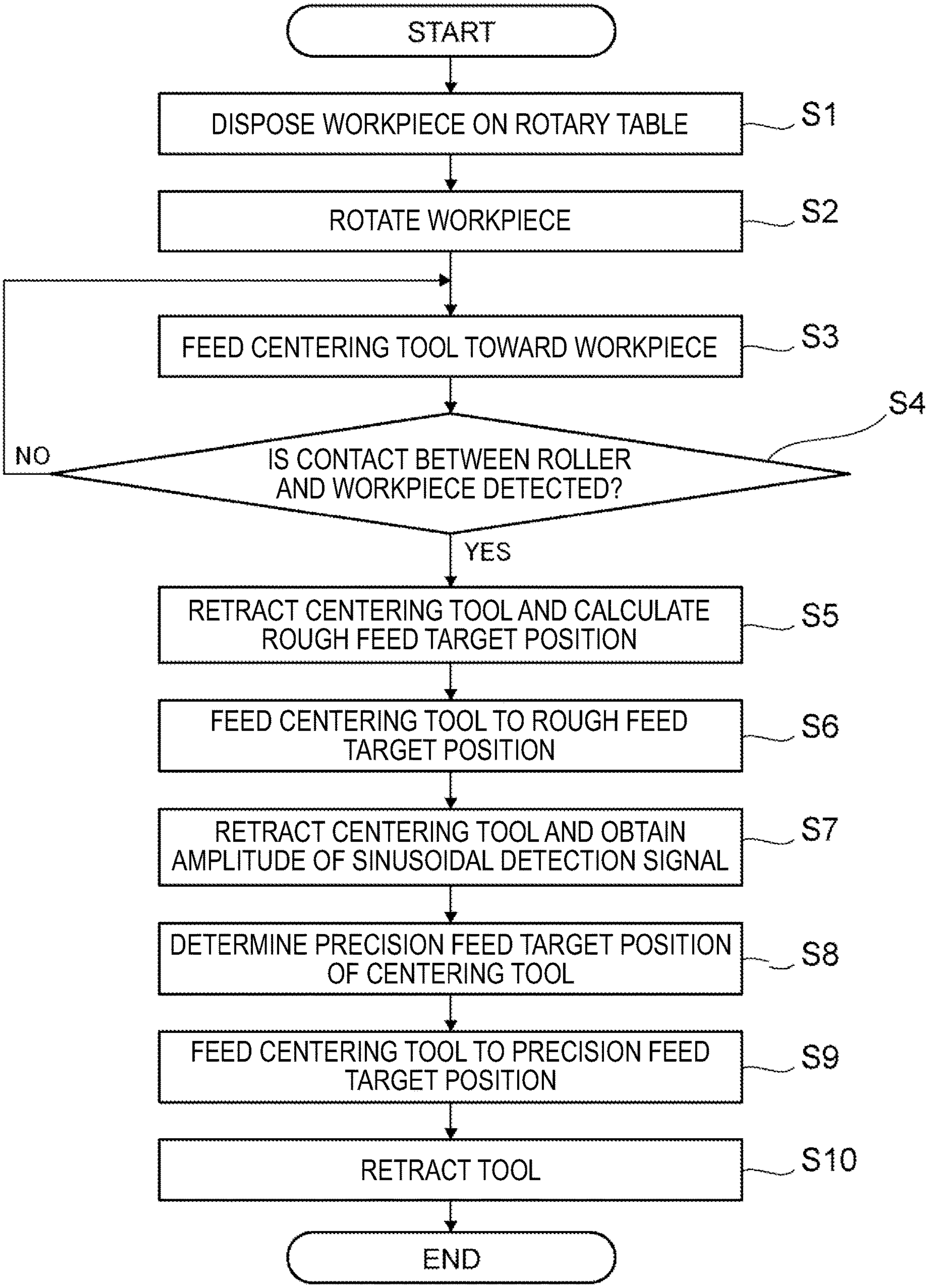
FIG. 4 is a flowchart illustrating the procedure of a centering step.
Figure 5:
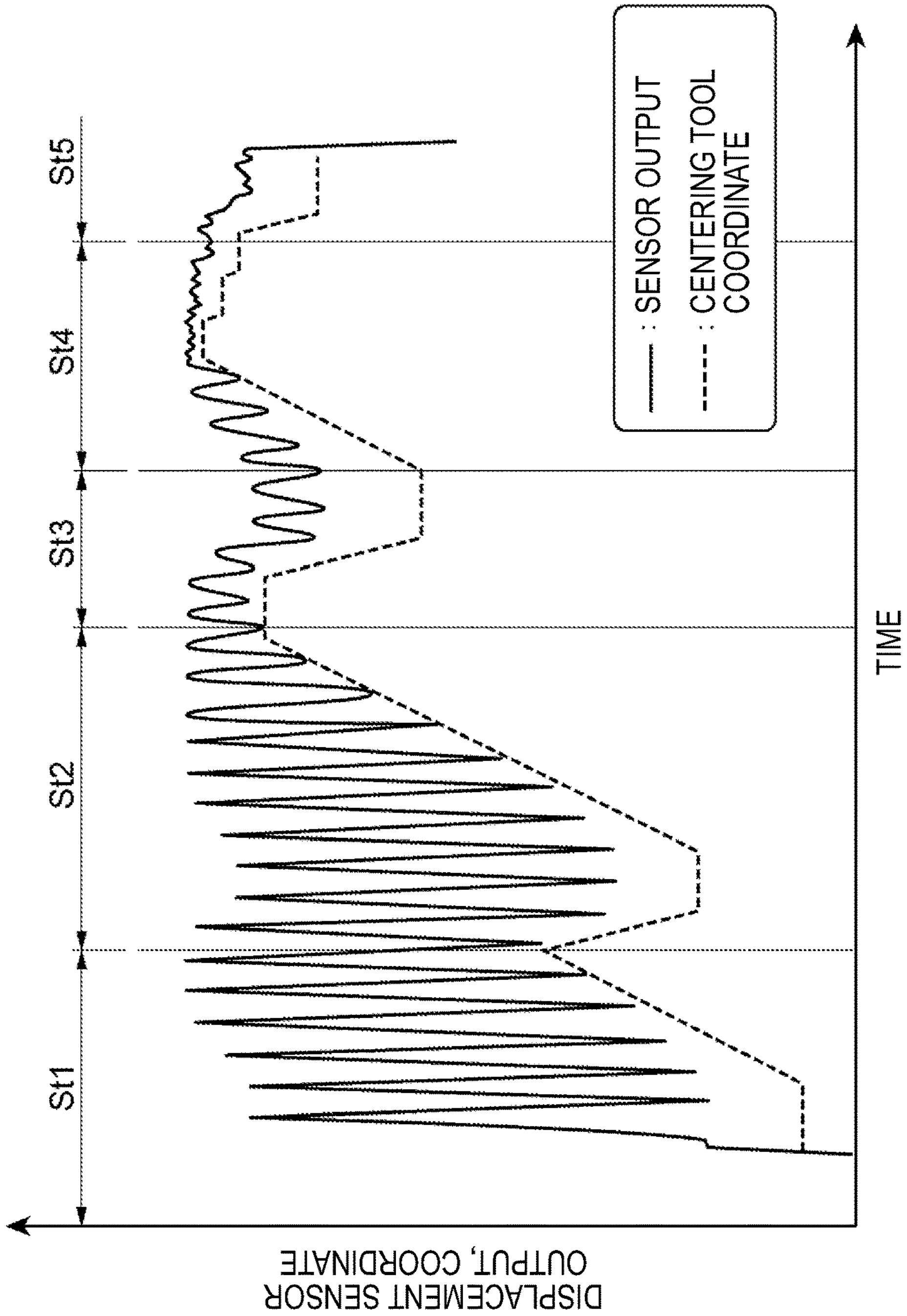
FIG. 5 is a graph schematically illustrating how the output of a displacement sensor and the feed amount of the centering tool change over time when the circular workpiece is centered using the centering tool.

A procedure for centering the circular workpiece W using the centering device 100 having the above configuration will be described. FIG. 4 is a flowchart illustrating the procedure of the centering step. FIG. 5 is a graph schematically illustrating how the output of the displacement sensor and the feed amount of the centering tool 15 change over time when the circular workpiece W is centered using the centering tool 15. Although the output of the displacement sensor here is illustrated as the measurement position of the circular workpiece W, this output is a signal for description different from the actual output signal. Carried out in this centering method are a contact confirmation step, a rough centering step, a target position determination step, and a centering feed step, which will be described in detail below. Hereinafter, the steps will be described in sequence.

(Contact Confirmation Step)

The circular workpiece W is disposed on the rotary table 11 as illustrated in FIG. 1 (S1). In this state, the center of the circular workpiece W and the rotation center of the rotary table 11 do not match. The control unit 21 rotates the circular workpiece W by rotationally driving the rotary table 11 using the workpiece drive unit 13 (S2). Then, the control unit 21 outputs a command for bringing the centering tool 15 closer to the circular workpiece W to the tool drive unit 19. The tool drive unit 19 receives the command from the control unit 21 and feeds the centering tool 15 toward the circular workpiece W at a constant speed (S3).

At this time, the circular workpiece W is eccentric from the rotation center of the rotary table 11. Accordingly, as illustrated in FIG. 5 as a first period (St1), the detection signal from the displacement sensor 41 at this time has a periodic waveform that repeats increase and decrease in accordance with the misalignment of the circular workpiece W. In this state, the waveform of the detection signal from the displacement sensor 41 can be predicted by calculation until the centering tool 15 comes into contact with the circular workpiece W. When the pair of rollers 35A and 35B of the centering tool 15 subsequently abut against the outer peripheral surface of the circular workpiece W, the waveform of the detection signal is disturbed and the actually measured value and the value calculated by prediction become different from each other. The contact confirmation unit 23 of the control unit 21 obtains the waveform of the detection signal from the displacement sensor 41 by prediction, detects that the predicted waveform is different from the actually measured value, and determines that the pair of rollers 35A and 35B and the circular workpiece W are in contact with each other (S4).

(Rough Centering Step)

Next, as illustrated in a second period (St2), the control unit 21 retracts the centering tool 15 by a certain distance in the direction opposite to the feed direction of the centering tool 15 after abutting against the circular workpiece. Then, using the detection signal that is output from the displacement sensor 41 at this retraction position, a rough feed target position of the centering tool 15 at which the circular workpiece W is not pushed excessively is obtained (S5). The rough feed target position here means a feed position at which the amplitude center of the detection signal of the displacement sensor 41 corresponds to a point near the maximum value of the amplitude and in front of the maximum value of the amplitude. In other words, the rough feed target position is a feed position at which the center of the circular workpiece W does not exceed the rotation center of the rotary table 11 while the misalignment between the center of the circular workpiece W and the rotation center of the rotary table 11 is reduced.

The control unit 21 feeds the centering tool 15 to the obtained rough feed target position and roughly decreases the misalignment of the circular workpiece W (S6).

(Target Position Determination Step)

Figure 6:
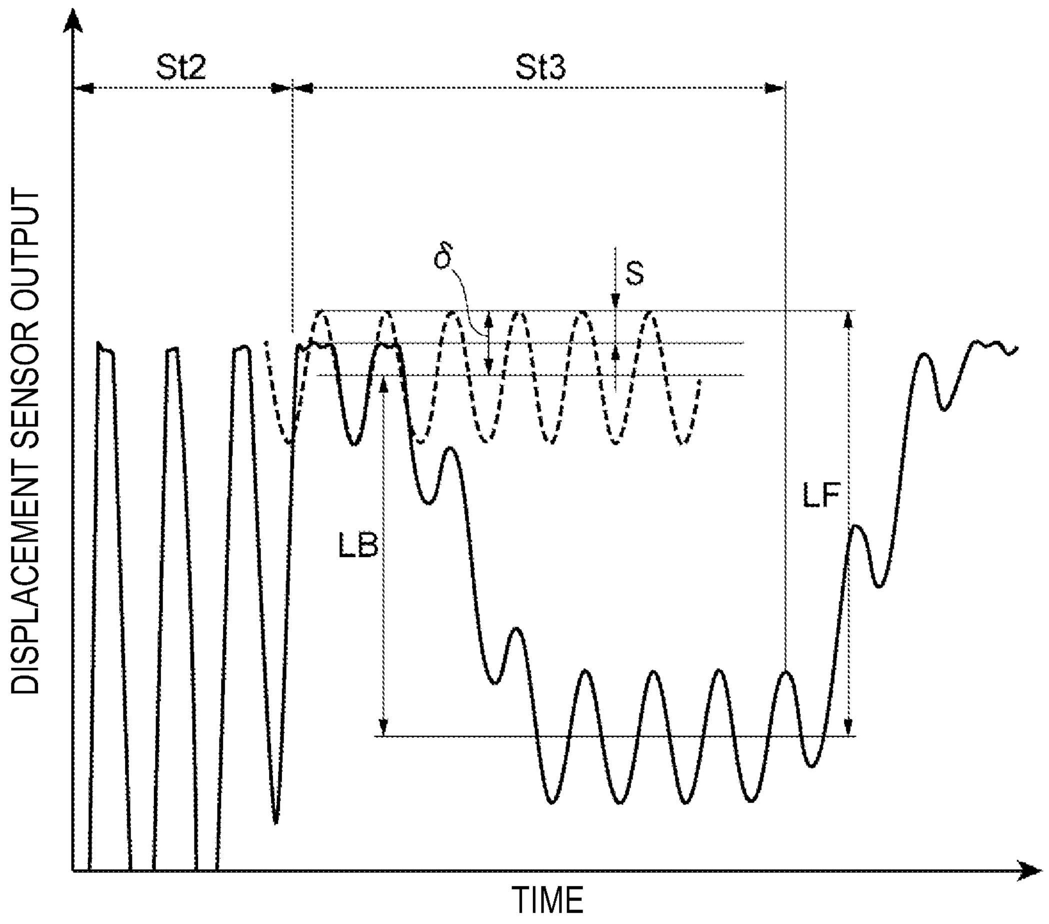
FIG. 6 is an explanatory diagram schematically illustrating the output of the displacement sensor in the second and third periods that are illustrated in FIG. 5.

FIG. 6 is an explanatory diagram schematically illustrating the output of the displacement sensor 41 in the second period (St2) and a third period (St3) illustrated in FIG. 5. The detection signal from the displacement sensor 41 of the centering tool 15 fed to the rough feed target position in the second period (St2) has a shape in which the upward convex peak of the waveform that repeats increase and decrease is collapsed. The solid line in FIG. 6 imitates the waveform of the detection signal from the displacement sensor 41. The dotted line in FIG. 6 is the waveform that slides the waveform (sine wave) of the detection signal from the displacement sensor 41 obtained when the centering tool 15 is retracted by a certain distance, to the pre-retraction position. The detection signal illustrated here is a signal for description, which is different from the actually measured value.

As is apparent from comparison between the solid and dotted lines, the waveform of the detection signal indicated by the solid line is a waveform in which the upward convex peak of the sine wave indicated by the dotted line is collapsed and the amplitude of the waveform is reduced by S. This is due to the deflection of the centering tool 15 that is attributable to the friction between the circular workpiece W and the installation surface of the rotary table 11, the axial rigidity of the shank portion 33 of the centering tool 15, and the like in a situation in which the pair of rollers 35A and 35B are pressed against the circular workpiece W.

From such a waveform with a collapsed upward convex peak, it is difficult to accurately obtain a misalignment $\delta$ caused by the insufficient push amount of the centering tool 15 due to the rough centering. In this regard, the target position determination unit 25 of the control unit 21 obtains a substantially sinusoidal detection signal with little peak collapse in order to set an accurate feed of the centering tool 15 in view of the deflection of the centering tool 15. Specifically, the control unit 21 retracts the centering tool 15 by a certain distance (first distance LB) as illustrated in the third period (St3). At this retracted position, there is no contact pressure between the circular workpiece W and the centering tool 15 and the detection signal from the displacement sensor 41 is a substantially sinusoidal signal with little collapse.

The target position determination unit 25 analytically obtains the post-rough centering misalignment δ from the detection signal that is obtained at the position where the centering tool 15 is retracted (S7). A method for calculating the misalignment δ will be described in detail later. Subsequently, the position where the centering tool 15 is moved forward by a second distance LF (=LB+δ) obtained by adding the post-rough centering misalignment δ to the first distance LB from the position retracted by the first distance LB after the immediately preceding step, that is, the position where the centering tool 15 is extended by the second distance LF toward the rotation center of the rotary table 11 is determined as a precision feed target position (S8).

(Centering Feed Step)

The centering feed unit 27 of the control unit 21 moves the centering tool 15 forward to the determined precision feed target position (S9). Then, as illustrated in a fourth period (St4) of FIG. 5, the amplitude of the detection signal from the displacement sensor 41 gradually decreases as the centering tool 15 is fed. When the centering tool 15 subsequently reaches the precision feed target position, the amplitude of the detection signal becomes sufficiently small and converges to a substantially constant value. The centering tool 15 at this time is in a state of being precisely centered on the axis of rotation of the rotary table 11.

Next, the centering feed unit 27 slightly retracts the centering tool 15 disposed at the precision feed target position, and further continues with the retraction while confirming that the amplitude of the detection signal does not increase (S10). It is preferable that the retraction of the centering tool 15 at this time is carried out in stages such that the centering tool 15 is repeatedly moved and stopped. In other words, even in a case where the centering tool 15 is pushed excessively and the circular workpiece W is misaligned from the rotation center of the rotary table 11 by the retraction being slight at first and the retraction distance being increased gradually, the misalignment can be pushed back by the rollers 35A and 35B of the centering tool 15. As a result, the circular workpiece W can be positioned at a precise centering position.

Here, the control unit 21 stores the detection signal that is output from the displacement sensor 41 when the centering tool 15 is disposed at the feed target position as a detection signal for evaluation for determining the pass or fail of the centering result.

After the above contact confirmation, rough centering, target position determination, and centering feed steps are carried out, the control unit 21 further retracts the centering tool 15 as in a fifth period (St5) and completes the centering step. The rough centering step described above can be omitted depending on the conditions.

<Centering Result Determination>

It is desirable that the circular workpiece centering step described above includes a determination step of determining the quality of the centering result after the completion of the centering of the circular workpiece W. By providing the determination step, the centering result can be evaluated quantitatively and it is possible to contribute to machining and processing precision enhancement in the next step. The misalignment that is obtained in this determination step is similar to the above processing through which the post-rough centering misalignment δ is obtained and will be described in detail here.

(Determination Step)

Figure 7:
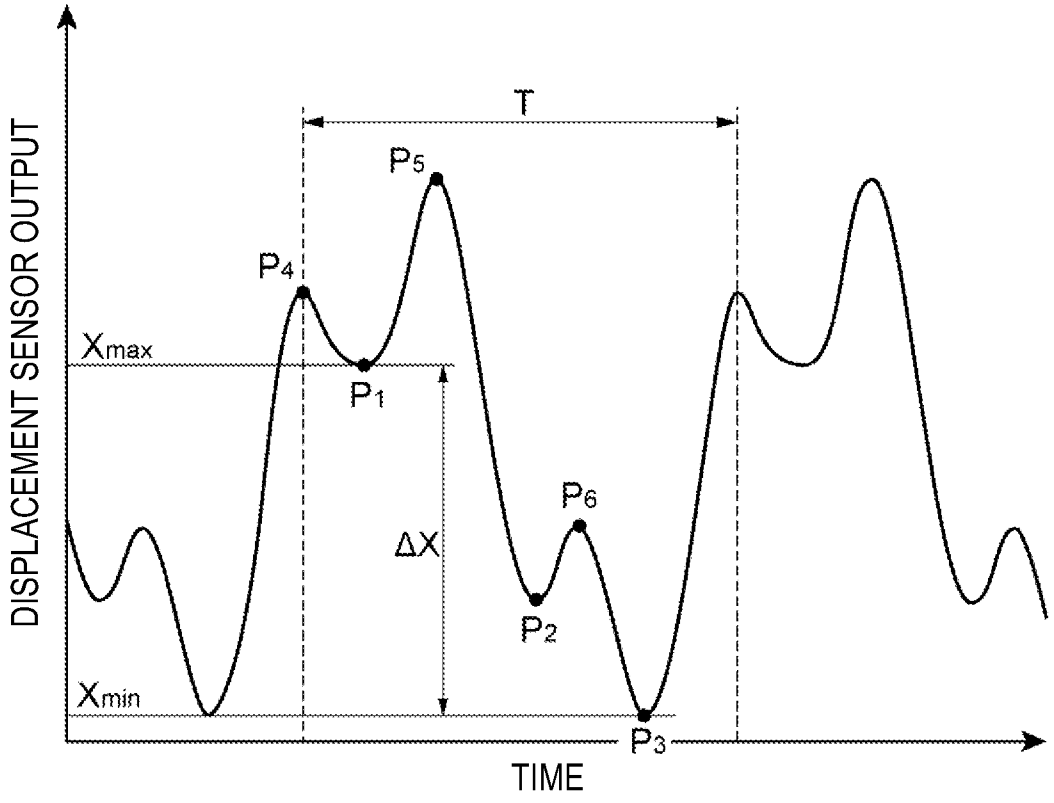
FIG. 7 is a graph schematically illustrating the waveform of a detection signal for evaluation.

Used in the determination step is the detection signal for evaluation detected when the centering tool 15 is disposed at the precision feed target position. FIG. 7 is a graph schematically illustrating the waveform of the detection signal for evaluation. The detection signal for evaluation represents the shape of the outer peripheral surface of the circular workpiece W measured by the displacement sensor 41 and has a repetitive waveform in which one rotation of the rotary table 11 is one cycle T. A signal for description is illustrated in FIG. 7 as well, and the signal is not the actually measured signal.

Figure 8:
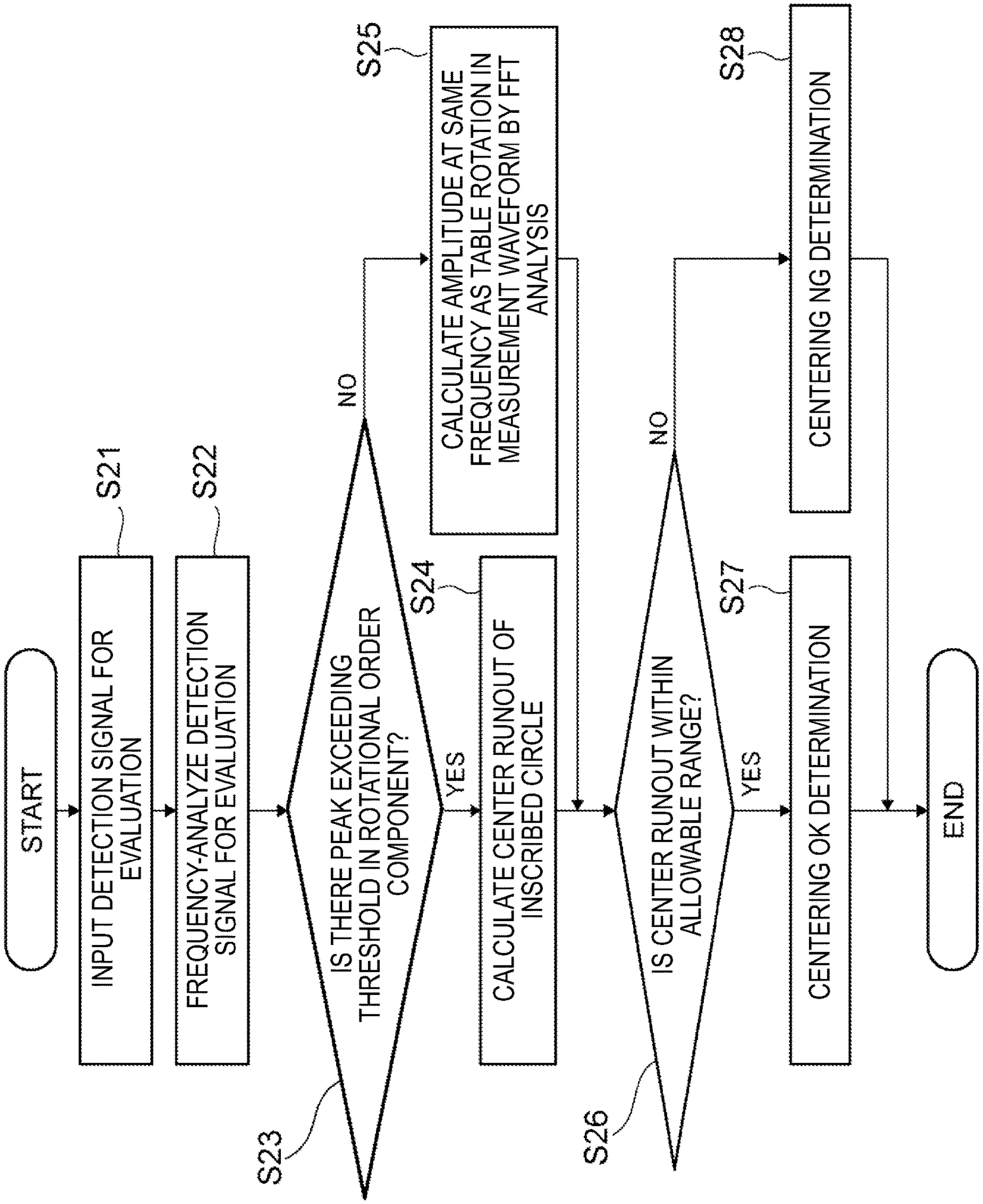
FIG. 8 is a flowchart illustrating a centering result determination procedure.

FIG. 8 is a flowchart illustrating the centering result determination procedure. The determination unit 29 of the control unit 21 illustrated in FIG. 1 takes in the detection signal for evaluation into the memory (S21) and frequency-analyzes the detection signal for evaluation (S22). Specifically, the strength of the amplitude components with different frequencies of the shape of the outer peripheral surface is obtained by the Fourier transform. For example, the frequency spectrum of the detection signal for evaluation is obtained by the fast Fourier transform (FFT) and the intensity of the rotational nth-order component of the shape of the outer peripheral surface is obtained from the power spectrum that shows the intensity distribution of the frequency spectrum.

Figure 9:
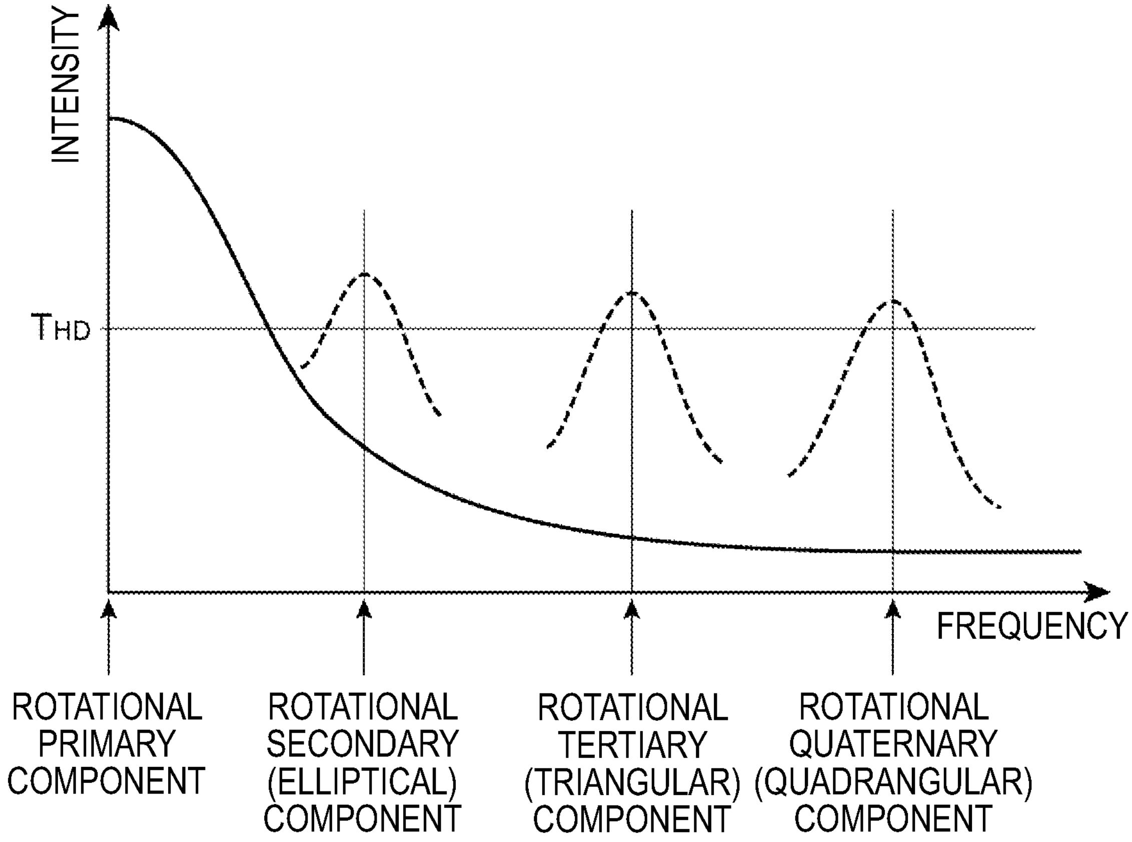
FIG. 9 is an explanatory diagram schematically illustrating the power spectrum of the detection signal for evaluation.

FIG. 9 is an explanatory diagram schematically illustrating the power spectrum of the detection signal for evaluation. In general, in the detection signal for evaluation representing the shape of the outer peripheral surface of the circular workpiece, the rotational primary component of the power spectrum becomes higher and the other rotational order components become lower, as indicated by the solid line in FIG. 9, as the outer peripheral surface becomes closer to a perfect circle. However, as indicated by the dotted line in FIG. 9, the actual shape of the outer peripheral surface of the circular workpiece is a mixture of polygonal components such as an ellipse (rotational primary component), a triangle (rotational tertiary component), and a quadrangle (rotational quaternary component) and the peak of the rotational nth-order component (n is an integer) may be generated in the power spectrum.

For example, when the shape of the outer peripheral surface of the circular workpiece deviates from a perfect circle and becomes close to an elliptical shape, a peak appears in the rotational secondary component (elliptical component) of the power spectrum. In addition, a peak appears in the rotational tertiary component (triangular component) when the shape of the outer peripheral surface of the circular workpiece becomes close to a triangle and a peak appears in the rotational quaternary component (quadrangular component) when the shape of the outer peripheral surface of the circular workpiece becomes close to a quadrangle. The peak intensity of the rotational nth-order component increases as the shape of the outer peripheral surface becomes closer to an n-sided polygon.

In this regard, it is determined whether the power spectrum of the detection signal for evaluation has a peak having a high intensity exceeding a predetermined threshold other than the rotational primary component (S23). In a case where the threshold is exceeded, the center runout of the inscribed circle in the outer peripheral surface of the circular workpiece W is calculated from the detection signal for evaluation (S24). A case where the threshold is not exceeded means a state of being close to a substantially circular shape. Accordingly, in this case, the amplitude at the same frequency as the rotation of the rotary table in the measurement waveform is calculated by FFT analysis (S25).

Figure 10:
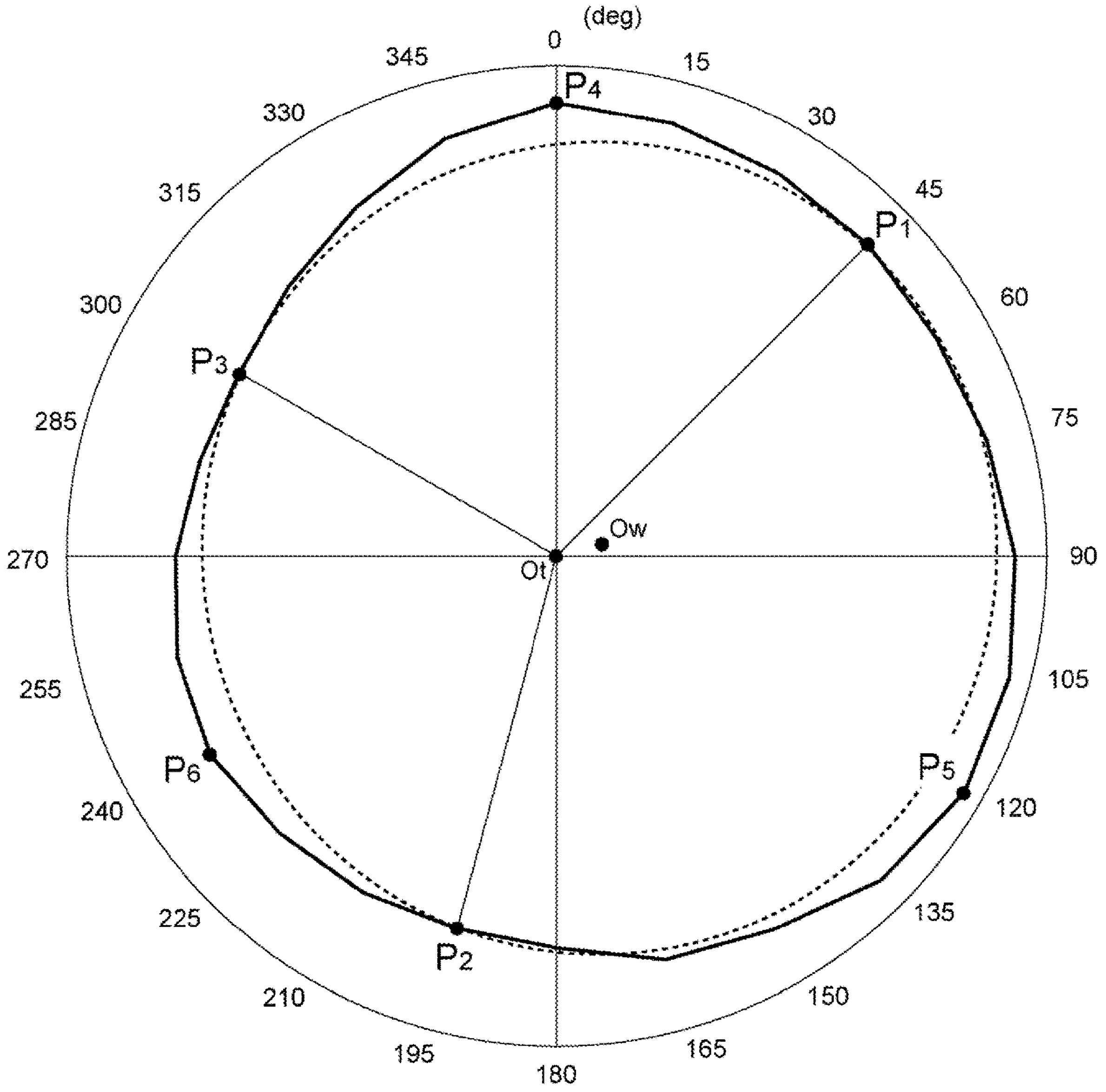
FIG. 10 is a chart schematically illustrating the displacement of the detection signal for evaluation in FIG. 7 for one cycle in polar coordinates.

Here, a procedure for calculating the center runout of the inscribed circle in the circular workpiece W will be described. FIG. 10 is a chart schematically illustrating the displacement of the detection signal for evaluation in FIG. 7 for one cycle (T) in polar coordinates. Displacement for description is illustrated in FIG. 10 as well, which is different from the actually measured value. The detection signal for evaluation indicates a change in the distance between the displacement sensor 41 and the outer peripheral surface of the circular workpiece W attributable to the rotation of the rotary table 11. The detection signal for evaluation becomes larger as the circular workpiece W becomes closer to the displacement sensor 41. In other words, as for the waveform of the detection signal for evaluation, downward convex peaks P1, P2, and P3 in FIG. 7 are recessed portions formed in the outer peripheral surface of the circular workpiece W and recessed to the inside in the radial direction and upward convex peaks P4, P5, and P6 in FIG. 7 are projecting portions formed on the outer peripheral surface of the circular workpiece W and projecting to the outside in the radial direction.

In other words, in the waveform (FIG. 7) of the detection signal that is output from the displacement sensor 41 while the rotary table 11 rotates once, the peaks P1, P2, and P3 are obtained that correspond to the bottom portions of the recessed portions generated by the displacement sensor 41 approaching the circular workpiece W and then moving away from the circular workpiece W and recessed to the inside in the radial direction. Subsequently obtained is a difference ΔX (=Xmax−Xmin) between a coordinate Xmax corresponding to the peak P1, which has the maximum value among the peaks P1, P2, and P3, and a coordinate Xmin corresponding to the peak P3, which has the minimum value among the peaks P1, P2, and P3.

This difference ΔX is an index corresponding to the difference between a rotation center Ot of the rotary table 11 and a center Ow of the inscribed circle that is indicated by the dotted line in FIG. 10 and inscribed in the peaks P1, P2, and P3, and this is the center runout of the inscribed circle.

The control unit 21 determines whether the center runout obtained as described above is within a predetermined allowable range (S26). In a case where the center runout is within the allowable range, the centering result is regarded as satisfactory (S27: centering OK determination). In a case where the center runout is out of the allowable range, the centering result is regarded as poor (S28: centering NG determination), the centering is terminated, and a worker is called. In either case, the obtained center runout is stored in the memory or the like as information contributing to the next step as a quantitative evaluation value for the centering result and can be presented as needed. The determination of the centering result ends through the above.

According to the centering method described above, highly precise centering can be realized without being affected by the deflection of the centering tool that is generated when the centering tool is pressed against the circular workpiece. The center of the inscribed circle in the shape of the circular workpiece can be centered to the rotation center of the rotary table. Accordingly, in a case where the centering tool is applied to a machine tool, it is possible to reliably ensure a material machining allowance in machining the circular workpiece with the machine tool. As a result, it is possible to machine the circular workpiece with high precision. In addition, the quality of the centering result can be accurately determined by quantitatively determining whether the obtained center runout of the inscribed circle is within the allowable range. In addition, the intensity of the elliptical or polygonal component of the shape of the circular workpiece is obtained by frequency analysis, quantitative evaluation is individually performed in a case where the obtained intensity exceeds the predetermined threshold and in a case where the obtained intensity does not exceed the threshold, and thus it is possible to respond flexibly to workpieces wide in range in terms of roundness and present a quantitative evaluation result regarding roundness appropriate for each.

<Centering Using Inner Peripheral Surface of Cylindrical Workpiece>

Figure 11:
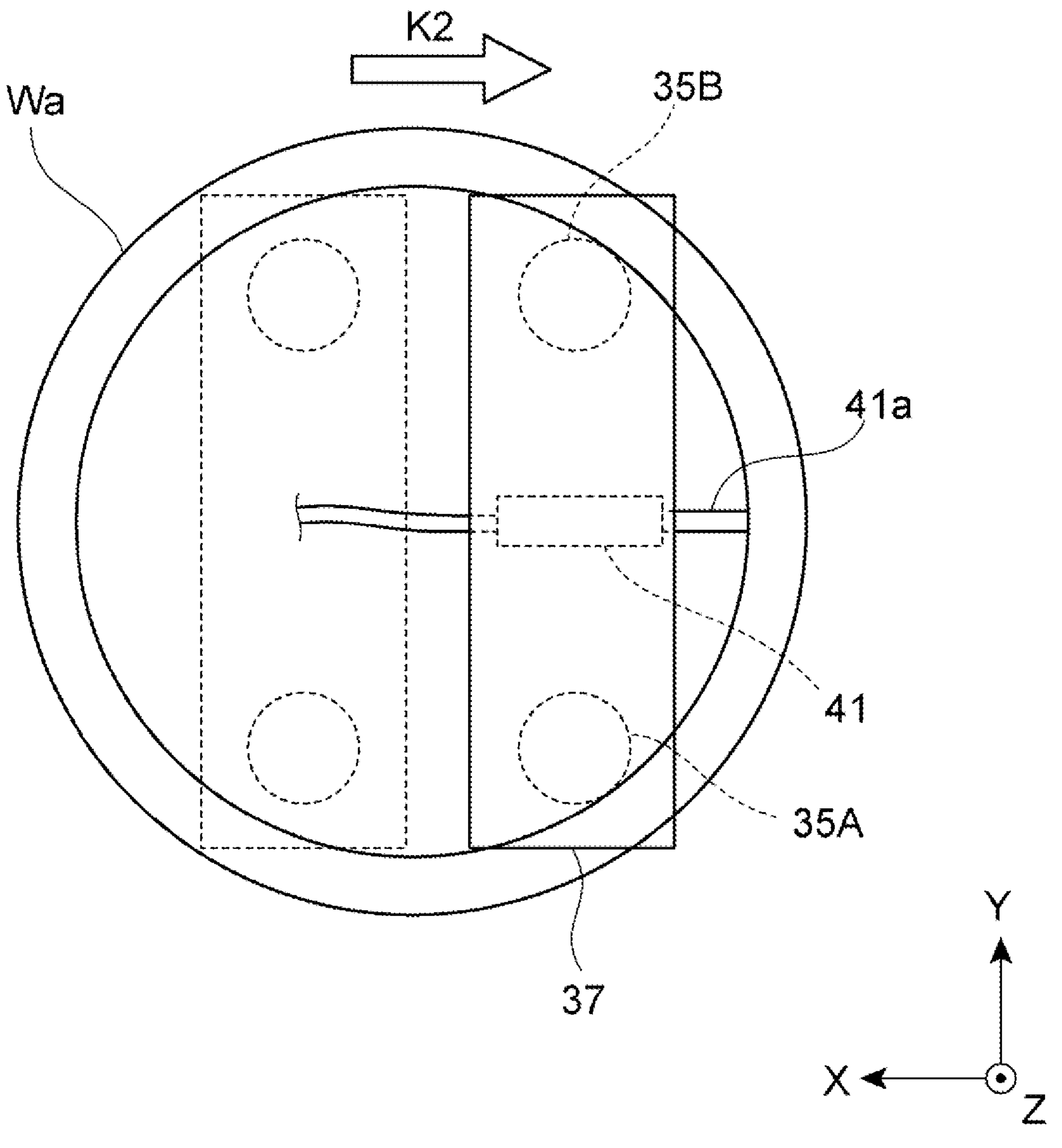
FIG. 11 is an explanatory diagram illustrating how the centering device performs centering using the inner peripheral surface of a cylindrical workpiece.

Although a columnar workpiece is used as the circular workpiece W in the configuration of the centering device 100, a cylindrical workpiece may be used instead and centering is possible in the same manner as the columnar workpiece regardless of the shape. In addition, in the case of a cylindrical workpiece, centering can be performed using an inner peripheral surface as well as an outer peripheral surface. FIG. 11 is an explanatory diagram illustrating how the centering device 100 performs centering using the inner peripheral surface of a cylindrical workpiece Wa. In this case, the pair of rollers 35A and 35B of the centering device 100 are inserted into the inner peripheral portion of the cylindrical workpiece Wa and fed in the −X direction. As a result, the pair of rollers 35A and 35B abut against the inner peripheral surface of the cylindrical workpiece Wa and the spindle 41*a* is also pressed against the inner peripheral surface of the cylindrical workpiece Wa.

From this state, the centering device 100 is fed in the direction of an arrow K2 as described above. As a result, the cylindrical workpiece Wa can be centered and the centering result can be determined.

<Application to NC Grinding Machine>

Figure 12:
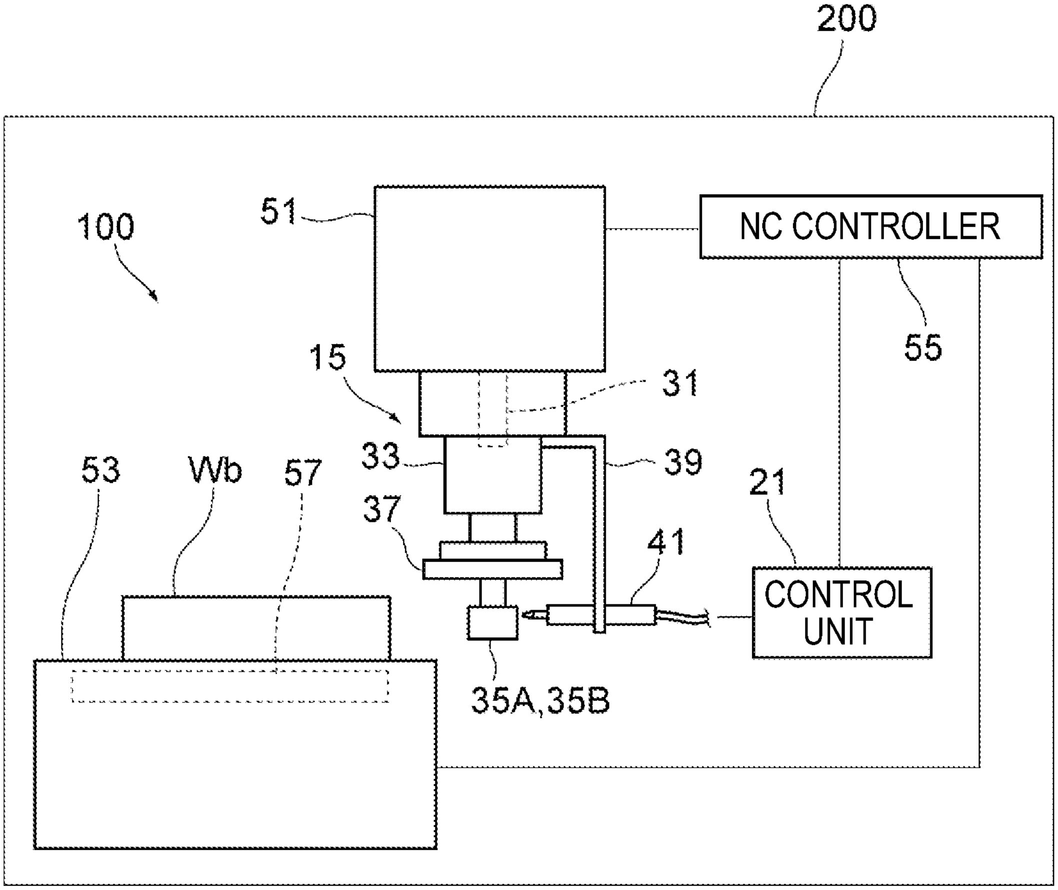
FIG. 12 is a schematic configuration diagram of a machine tool to which the centering device is applied.

Next, an example in which the centering device 100 is applied to a machine tool will be described. FIG. 12 is a schematic configuration diagram of the machine tool to which the centering device 100 is applied. A machine tool 200 includes at least one machining shaft 51, a main shaft 53 where a circular workpiece Wb is disposed, and an NC controller 55 driving the machining shaft 51 and the main shaft 53. The circular workpiece Wb is fixed to the main shaft 53 by a magnet chuck 57 provided in the main shaft 53. The control unit 21 of the centering device 100 is connected to the NC controller 55, and a signal corresponding to the detection signal of the displacement sensor 41 is input from the control unit 21 to the NC controller 55. The NC controller 55 functions as the tool drive unit 19 and the workpiece drive unit 13 (see FIG. 1) of the centering device 100 and controls the rotation of the main shaft 53 and the movement (feed) of the machining shaft 51.

Examples of the machine tool 200 include various machine tools such as a grinding machine, a milling machine, and a lathe. In any case, the circular workpiece Wb can be centered using the machining shaft 51 of the machine tool and the work efficiency can be improved without complicating steps. Accordingly, tact time reduction and productivity improvement can be achieved.

In addition, in the centering device 100, the shank portion 33 has the shaft portion 31 for attachment. Accordingly, the centering device 100 can be easily attached like a tool to the machining shaft 51 of the machine tool. Accordingly, it is not necessary to center the circular workpiece Wb with a device for centering the circular workpiece Wb set around the main shaft 53, which is described above as an example of cumbersome labor. Accordingly, processing such as centering the circular workpiece Wb by stocking the centering device 100 in a tool changer (not illustrated) and attaching the centering device 100 to the machining shaft 51 at a required timing can be performed smoothly.

The centering described above can be automatically performed by storing a program for causing the NC controller 55 to execute the centering operation procedure by the control unit 21 and causing the NC controller 55 to execute the program. In addition, in a case where another circular workpiece different in size and shape is centered, the setup can be easily changed by inputting a workpiece shape parameter as appropriate when executing the stored program.

<Other Application Examples>

The centering device 100 described above can be applied to, for example, centering process in a step of manufacturing a circular workpiece such as a ring member, the inner ring of a bearing (at least one of the inner and outer rings), and an outer ring. Further, the present invention is not limited thereto and is also applicable to a step of and a method for manufacturing a machine or a vehicle in which the bearing is mounted. Specifically, the present invention is applicable in centering a ring-shaped workpiece such as a rotational support portion of a linear motion device such as a machine having a rotating portion, various manufacturing devices, a screw device such as a ball screw device, and an actuator (such as combination of a linear motion guide bearing and a ball screw, an XY table), a rotational support portion of a steering device such as a steering column, a universal joint, an intermediate gear, a rack and pinion, an electric power steering device, and a worm reducer, and a rotational support portion of a vehicle such as an automobile, a motorcycle, and a railway vehicle. Such a centering method can be suitably used in steps of manufacturing various ring members, bearings, machines, vehicles, and so on, and productivity and product quality improvement can be achieved by the method.

Figure 13:
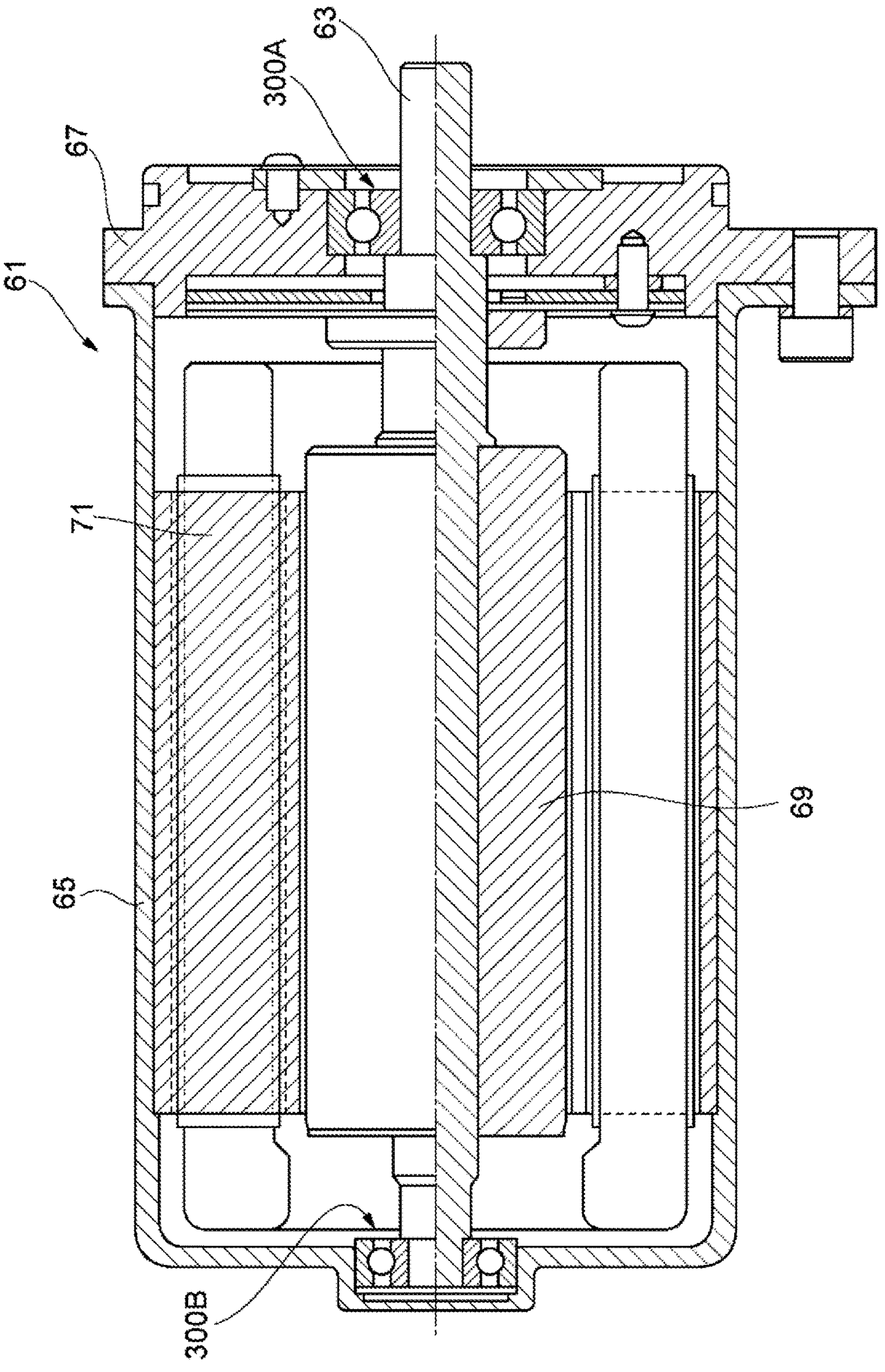
FIG. 13 is a schematic configuration diagram of a motor to which a bearing is applied.

The bearing can be applied to, for example, bearings 300A and 300B supporting a rotating shaft 63 of a motor 61 illustrated in FIG. 13. The motor 61 is a brushless motor and has a cylindrical center housing 65 and a substantially disk-shaped front housing 67 blocking one opening end portion of the center housing 65. Inside the center housing 65, the rotatable rotating shaft 63 is supported along the axis of the center housing 65 and via the bearings 300A and 300B disposed in the bottom portions of the front housing 67 and the center housing 65. A rotor 69 for driving a motor is provided around the rotating shaft 63, and a stator 71 is fixed to the inner peripheral surface of the center housing 65.

The motor 61 of the above configuration is generally mounted in a machine or a vehicle and rotationally drives the rotating shaft 63 supported by the bearings 300A and 300B.

Figure 14:
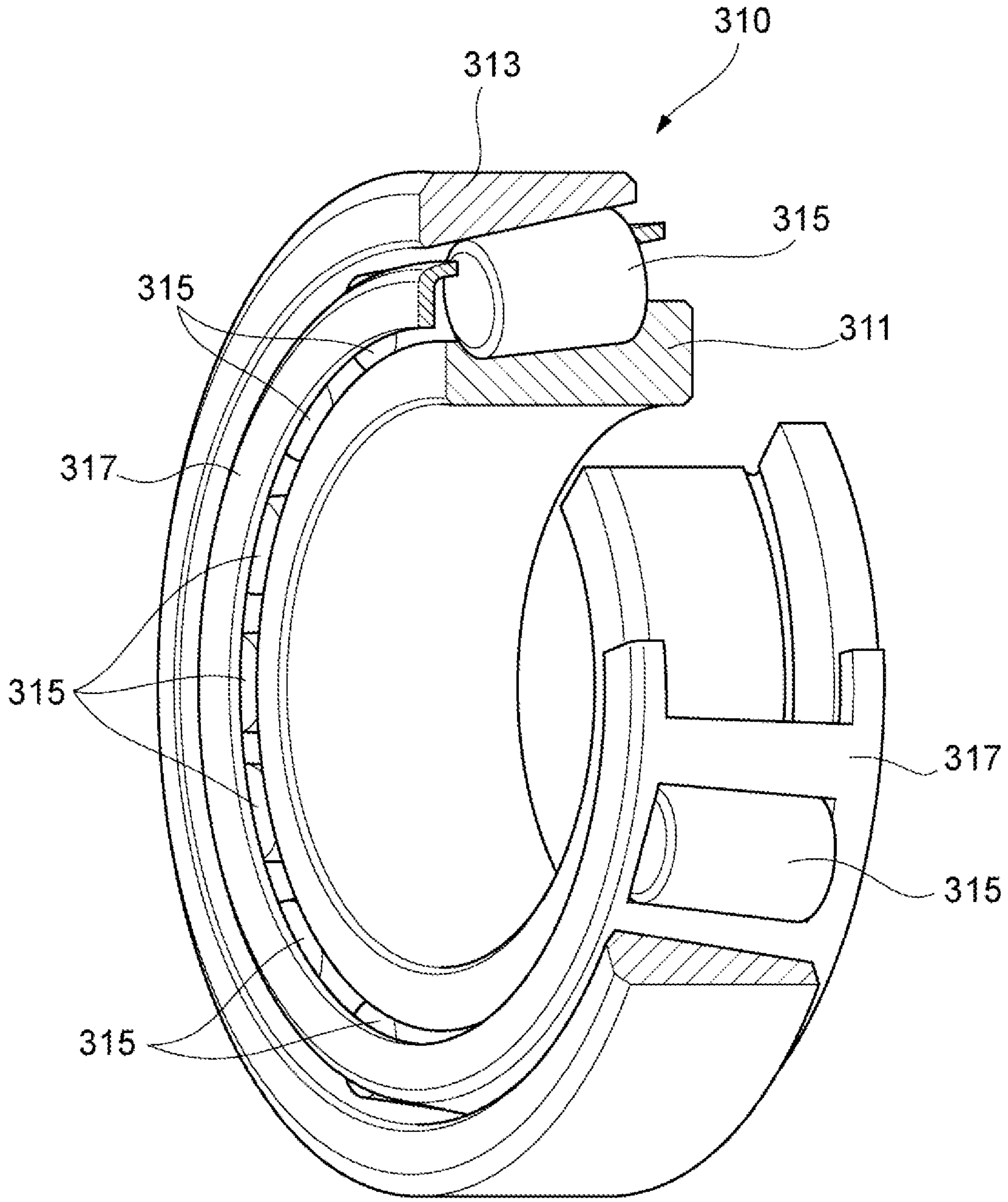
FIG. 14 is a configuration diagram of a conical roller bearing.

In addition, a bearing applicable to production using the centering device 100 described above may be, for example, a conical roller bearing 310 illustrated in FIG. 14. Although the conical roller bearing 310 exemplified in FIG. 14 is a radial conical roller bearing including an inner ring 311, an outer ring 313, a plurality of rolling elements (conical rollers 315), and a cage 317 holding the conical rollers 315, the present invention is not limited thereto and other forms of conical roller bearings may be used. In addition, the rolling element may be columnar or spherical. In other words, the present invention is applicable to the production of a circular workpiece such as a slide bearing as well as a rolling bearing insofar as the workpiece has a circular outer peripheral shape or a circular inner peripheral shape. These bearings that are large in size are used in, for example, supporting rotating portions in various apparatuses such as wind power generators, steel rolling machines, and CT scanning apparatuses, and production using the centering device 100 is particularly suitable for a workpiece with an outer or inner diameter of 100 mm or more and 600 mm or less. In addition, the centering device 100 can be made smaller or larger and can be applied to circular workpieces with other sizes.

As described above, the present invention is not limited to the above embodiment. Mutual combinations of the configurations of the embodiment and modifications and applications by those skilled in the art based on the description of the specification and known techniques are also intended by the present invention and included in the scope of protection. For example, the displacement sensor can be of any type. In addition, a sensor (detection means or detection member) other than the displacement sensor can be attached.

This application is based on a Japanese patent application filed on Oct. 21, 2020 (Japanese Patent Application No. 2020-176855), the contents of which are incorporated herein by reference.

REFERENCE SIGNS LIST

11 rotary table
13 workpiece drive unit
15 centering tool
17 tool support portion
19 tool drive unit
21 control unit
23 contact confirmation unit
25 target position determination unit
27 centering feed unit
29 determination unit
31 shaft portion for attachment
33 shank portion
35A, 35B roller (contact)
37 rotating member
39 bracket
39*a* one end portion
39*b* the other end portion
41 displacement sensor
41*a* spindle
51 machining shaft
53 main shaft
55 NC controller
57 magnet chuck
61 motor
63 rotating shaft
65 center housing
67 front housing
69 rotor
71 stator
100 centering device
200 machine tool
300A, 300B bearing
310 conical roller bearing
W, Wb circular workpiece
Wa cylindrical workpiece

The invention claimed is:

1. A centering tool comprising:

a shank portion having a shaft portion for attachment;

a rotating member rotatably supported by the shank portion and having a pair of contacts disposed apart from each other in a direction orthogonal to an axis of the shank portion; and a displacement sensor provided integrally with the shank portion and detecting displacement in the direction orthogonal to the axis at an intermediate position between the pair of contacts, wherein a circular workpiece is centered by being pushed toward a rotation center of a rotary table while each of the pair of contacts is caused to abut against a peripheral surface of the circular workpiece disposed on the rotary table, and wherein the displacement sensor is fixed to the shank portion via a bracket and is provided so as not to rotate with rotation of the rotating member.

2. The centering tool according to claim 1, wherein the pair of contacts are rollers rotating around axes parallel to the axis.

3. The centering tool according to claim 1, wherein the displacement sensor is a contact-type displacement sensor.

4. The centering tool according to claim 1, wherein the bracket supports the displacement sensor at a same axial position as the pair of contacts along the axis.

* * * * *